United States Patent
Sanneck et al.

(10) Patent No.: US 9,900,210 B2
(45) Date of Patent: Feb. 20, 2018

(54) ESTABLISHING CONNECTIVITY BETWEEN A RELAY NODE AND A CONFIGURATION ENTITY

(75) Inventors: Henning Sanneck, München (DE); Peter Szilagyi, Debrecen (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 13/640,051

(22) PCT Filed: Apr. 9, 2010

(86) PCT No.: PCT/EP2010/054727
§ 371 (c)(1),
(2), (4) Date: Oct. 9, 2012

(87) PCT Pub. No.: WO2011/124266
PCT Pub. Date: Oct. 13, 2011

(65) Prior Publication Data
US 2013/0028139 A1  Jan. 31, 2013

(51) Int. Cl.
*H04L 12/28* (2006.01)
*H04W 4/00* (2009.01)
*H04L 12/24* (2006.01)
*H04W 76/02* (2009.01)
*H04W 88/04* (2009.01)

(52) U.S. Cl.
CPC ...... *H04L 41/0803* (2013.01); *H04L 41/0886* (2013.01); *H04W 76/02* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2003/0095520 A1 | 5/2003 | Aalbers et al. | |
| 2004/0204097 A1 | 10/2004 | Scheinert et al. | |
| 2005/0148368 A1 | 7/2005 | Scheinert et al. | |
| 2006/0171387 A1* | 8/2006 | Kang et al. | 370/389 |

(Continued)

FOREIGN PATENT DOCUMENTS

EP 2110990 A1 10/2009

OTHER PUBLICATIONS

The Road to IMT-Advanced Communication Systems: State-of-the-Art and Innovation Areas Addressed by the Winner + Project, Osseiran A. et al, [topics in radio communications] IEE Communications Magazine, IEE Service Center, Pischataway, US, vol. 47, No. 6, Jun. 1, 2009 pp. 38-47, XP011263344.

(Continued)

*Primary Examiner* — Jutai Kao
(74) *Attorney, Agent, or Firm* — Squire Patton Boggs (US) LLP

(57) ABSTRACT

A method of establishing connectivity between a relay node and an OAM entity in a communications network, the method comprising the steps of: establishing a connection between the relay node and a user plane of the communications network; addressing communications to the OAM entity defined as residing in an OAM subnet via a gateway in the user plane; and routing the communications from the user plane to the OAM subnet.

14 Claims, 4 Drawing Sheets

(56) References Cited

U.S. PATENT DOCUMENTS

| | | | |
|---|---|---|---|
| 2008/0089311 A1* | 4/2008 | Roy | H04B 7/2612 |
| | | | 370/345 |
| 2009/0059822 A1 | 3/2009 | Morrill et al. | |
| 2010/0190497 A1* | 7/2010 | Pudney et al. | 455/435.1 |
| 2010/0268951 A1* | 10/2010 | Ryu | H04W 36/0038 |
| | | | 713/169 |
| 2011/0069637 A1* | 3/2011 | Liu et al. | 370/254 |
| 2011/0244851 A1* | 10/2011 | Gunnarsson et al. | 455/423 |

OTHER PUBLICATIONS

TR36.806 V0.2.2 3rd Generation Partnership Project-Technical Specification Group Radio Access Network Evolved Universal Terrestrial Radio Access (E-UTRA);Relay architectures for E-UTRA (LTE-Advanced)(Release 9).

3GPP TS 23.401 V9.2.0 Technical Specification Group Services and System Aspects; General Packet Radio Service (GPRS) enhancements for Evolved Universal Terrestrial Radio Access Network (E-UTRAN) access (Release 9).

IEEE 802.16j Amendment to IEEE Standard for Local and metropolitan area networks—Part 16: Air Interface for Broadband Wireless Access Systems—Amendment 1: Multiple Relay Specification.

Japanese Office Action application No. 2013-503010 dated Dec. 9, 2013.

* cited by examiner

ESTABLISHING CONNECTIVITY BETWEEN A RELAY NODE AND A CONFIGURATION ENTITY

This invention relates to network nodes. It is particularly, but not exclusively, related to establishing connectivity between a network node such as a relay node and a configuration entity.

Relay nodes are mobile network elements having functionality similar to base stations in terms of being able to provide access to customer user equipment (UE) such as mobile terminals. In addition, they can connect to a mobile network via an in-band wireless backhaul link to a base station instead of using a dedicated wired or wireless backhaul link, such as a microwave backhaul link. In-band relaying from the perspective of the base station means that the same radio resources are used both by relay nodes and by UEs. The purpose of using relay nodes is to provide coverage extension to regions of high shadowing or locations where dedicated backhaul links are not deployed. Relay nodes can also be used to enhance capacity.

Relay nodes have been standardised for WiMAX (Worldwide Interoperability for Microwave Access) networks. Relays for LTE (Long Term Evolution) networks are currently being standardised.

In LTE networks, relaying functionality is to be provided by relay nodes (RNs). An RN connects to an enhanced Node B (eNodeB or eNB), which is referred to as a Donor eNodeB (DeNB) for that particular RN. Communication between the RN and the network is performed via the DeNB. A radio link between the RN and the DeNB is called a relay link. Mobile terminals can connect either directly to an eNodeB or to a RN, and both connection types are called access links.

For an RN it is not necessary to provide a dedicated backhaul link, for example in the form of a fixed line or a microwave link.

Figure 1:
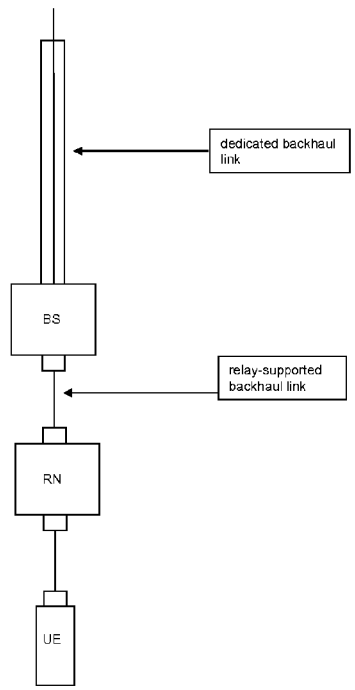

Relay nodes are capable of providing coverage extension in a mobile network at a lower hierarchical level than a node comprising a base station. FIG. 1 shows a relay node (RN) relaying user traffic between a mobile terminal (UE) and a base station (BS) serving as a DeNB.

It is desirable to have a cost-effective and flexible way of deploying relay nodes. Accordingly, it will be understood that for deployment of RNs, convenience of automation of initial configuration, also referred to as self-configuration, is important.

When an RN is being set up in a mobile network initially, typically it does not have a wired or dedicated wireless backhaul link and so such a connection is not available to connect to the core network or to an operation, administration, and maintenance (OAM) system. Therefore, as a first step, it is necessary to set up a radio connection with a base station which is available to provide coverage at the location of the RN and use this to establish a radio bearer for communication. The RN firstly connects to a mobile network via an air interface which is specifically configured to provide UE access (also referred to as a Uu interface).

Apart from some aspects of device management, UEs do not need network management, and do not have a connection with an OAM system of a network. Network elements, on the other hand, do tend to have a connection with the OAM system, via which alarms, configuration, and re-configuration messages are transferred. Accordingly, it is currently not possible for RNs to use an interface provided for the purposes of providing UE access to communicate readily with the OAM system, or more specifically to gain access to nodes in the OAM system. (Logically, the OAM system can be seen as one node although physically it is usually a distributed system.)

A configuration method referred to as plug-and-play is used to configure wired network elements such as eNBs. They use a dedicated backhaul link to connect to a core network of a mobile network. This dedicated link, when established, provides Layer 2 connectivity between an eNB and a core network. This may involve something as simple as just plugging in an Ethernet cable which connects the eNB to the core network via suitable gateway and security functionalities. Making such a connection can be used to acquire IP connectivity (for example by using the dynamic host configuration protocol (DHCP)). However, the plug-and-play method does not work for RNs because there is no dedicated backhaul link to the core network, and no Layer 2 connectivity is provided. The Uu interface only provides connectivity to user plane services (for example to access the Internet), but not the core network itself.

According to a first aspect of the invention there is provided a method of establishing connectivity between a network node and a configuration entity in a communications network, the method comprising the steps of:
establishing a connection between the network node and a user plane of the communications network;
addressing communications to the configuration entity defined as residing in a configuration entity subnet; and
routing the communications from the user plane to the configuration entity subnet.

Preferably, the connection is established to a gateway in the user plane. It may be established to a PDN gateway.

Preferably, the connectivity is established to enable the network node to be configured by the configuration entity.

Preferably, the network node is a relay node. It may be a network node having the capability to connect to a base station via an in-band wireless backhaul link. It may connect to a Donor eNodeB (DeNB). Preferably, the network node is configured so that it is not provided with a desired DeNB association in advance of seeking to establish a connection with it. DeNB association may be computed by an OAM system once the network node has established a connection to it.

Preferably, the network node provides access links to mobile terminals.

Preferably the configuration entity comprises an OAM subnet. Preferably the configuration entity comprises an OAM system.

The network node may connect to a mobile network via an air interface which is specifically configured to provide UE access. This may be Uu interface).

Preferably, during self-configuration of the network node, it may make an initial connection to an arbitrary eNB, which will be referred to as a configurator eNB, or an initial eNB.

Preferably, the network node requests that it be assigned a network address. This may be an IP address. It may be assigned by DHCP. DHCP traffic may travel to a core network along a path through a user plane GTP tunnel.

A method according to the invention may involve the stages of preparation, connectivity establishment as a UE, connectivity establishment as a network node, and establishment of secure connectivity to an OAM subnet.

Establishing a connection to the DeNB may take place after these stages.

A preparation stage may enable auto-connectivity. Auto-connectivity is the ability of a network node to establish a connection to a configuration entity which can then by used to configure the network node.

A network entity may be configured with an APN defining the configuration entity as a PDN. A gateway may be configured to host the APN so that the gateway is able to route traffic to the configuration entity. There may be a number of APNs to differentiate between a number of PDNs.

A number of network nodes may undergo in a common pre-provisioning operation in which respective subscription data entries for each are created which can subsequently be used in configuration of the associated network nodes. This may involve providing the subscription data entries with a network node indication indicating a normal mobile terminal or a network node.

The network node indication may be sent to a mobility management entity in a connection request to allow the mobility management entity to reject connection requests in respect of UEs that are not authorised to operate as a network node.

Preferably, an attach procedure used to authenticate the network operator and to establish a default bearer. The attach procedure may set up a user plane GTP tunnel and to provide access to a specific PDN. This may be for the purpose of carrying user traffic from a network element of a network serving the network node to a gateway.

The network node may use a protocol configuration element to indicate the manner by which an address for the network node is to be obtained. The network node may indicate that a DHCP server is to provide the address. In this way, it may not be necessary for a gateway to carry out automatic address allocation as part of bearer establishment.

Preferably, connectivity establishment as a network node is used to establish IP connectivity. This may involve a DHCP client in the network node sending a DHCP request which is conveyed to a configured DHCP server in the configuration entity.

Preferably, the identity of the network node is verified. The network node may establish a mutually authenticated TLS session with network management. In establishing a secure connection there may be establishment of a secure tunnel and encryption. However, in one embodiment of the invention, the secure tunnel may be omitted.

Preferably, the method involves auto-connection and authentication. The network node may be authenticated by a certification authority (CA) server of the network. The network node may then be able to establish a tunnel between itself and a security gateway.

An encrypted connection may be established after the tunnel has been established.

Auto-connectivity may involve an IPsec tunnel being established on top of secure transport connectivity using TLS.

Once a secure link to the configuration entity has been established, it can be used for the network node to carry out further steps in a self-configuration procedure, including auto-commissioning and integration of the network node.

According to the invention, a secure tunnel may pass through a gateway to extend to the user plane and then return back to the gateway where it terminates. This may be a security gateway.

Preferably, extending between certain points of the network, their may be an encrypted data link inside a tunnel having an endpoint at the network node, which is inside another tunnel which has an end point in the user plane. Various of these links and tunnels may terminate at different points, for example within different nodes, in the network.

Connecting from the user plane to the configuration entity may be done by using a specifically configured gateway so that it provides a connection to the configuration entity.

Preferably, the communications network is a mobile network.

According to a second aspect of the invention there is provided a communication network comprising:
a network node, a user plane, and a configuration entity in a configuration entity subnet, the communications network being configured to establish a connection between the network node and the user plane, the network node being capable of addressing communications to the configuration entity defined as residing in a configuration entity subnet, the communications network being configured to route communications from the user plane to the configuration entity subnet in order to establish connectivity between the network node and the configuration entity.

According to a third aspect of the invention there is provided a network node capable of establishing connectivity with a configuration entity in a communications network, the network node comprising:
a protocol capability configured to establish a connection between the network node and a user plane of the communications network;
an addressing capability configured to address communications to the configuration entity defined as residing in a configuration entity subnet in order that the communications are routed from the user plane to the configuration entity subnet.

According to a fourth aspect of the invention there is provided a computer program product comprising software code that when executed on a computing system performs a method of establishing connectivity between a network node and a configuration entity in a communications network, the method comprising the steps of:
establishing a connection between the network node and a user plane of the communications network;
addressing communications to the configuration entity defined as residing in a configuration entity subnet; and
routing the communications from the user plane to the configuration entity subnet.

Preferably, the computer program product has executable code portions which are capable of carrying out the steps of the method.

Preferably, the computer program product is stored on a computer-readable medium.

Figure 2:
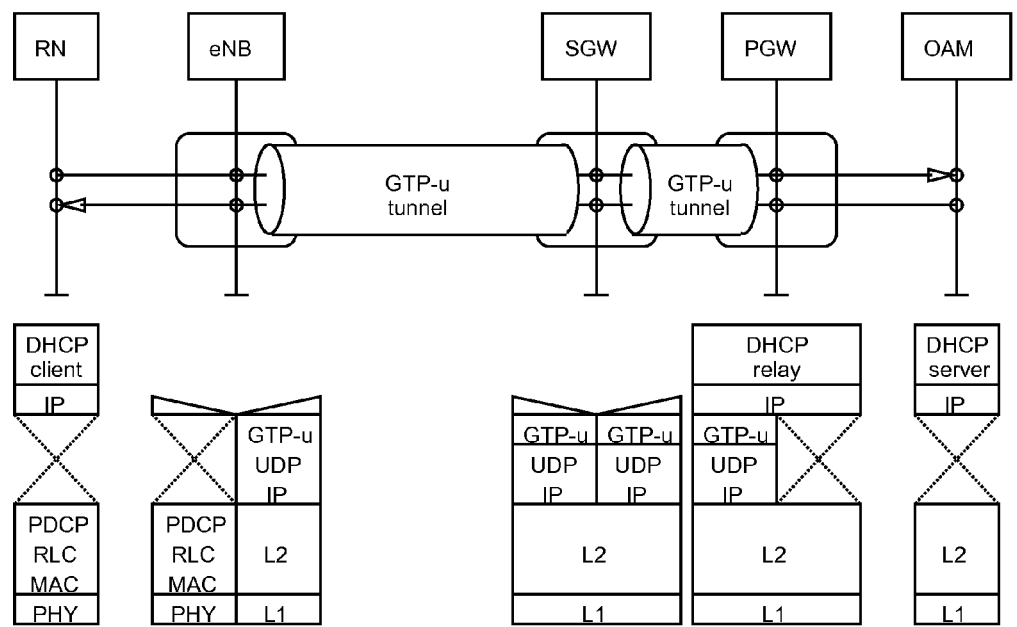
Figure 3:
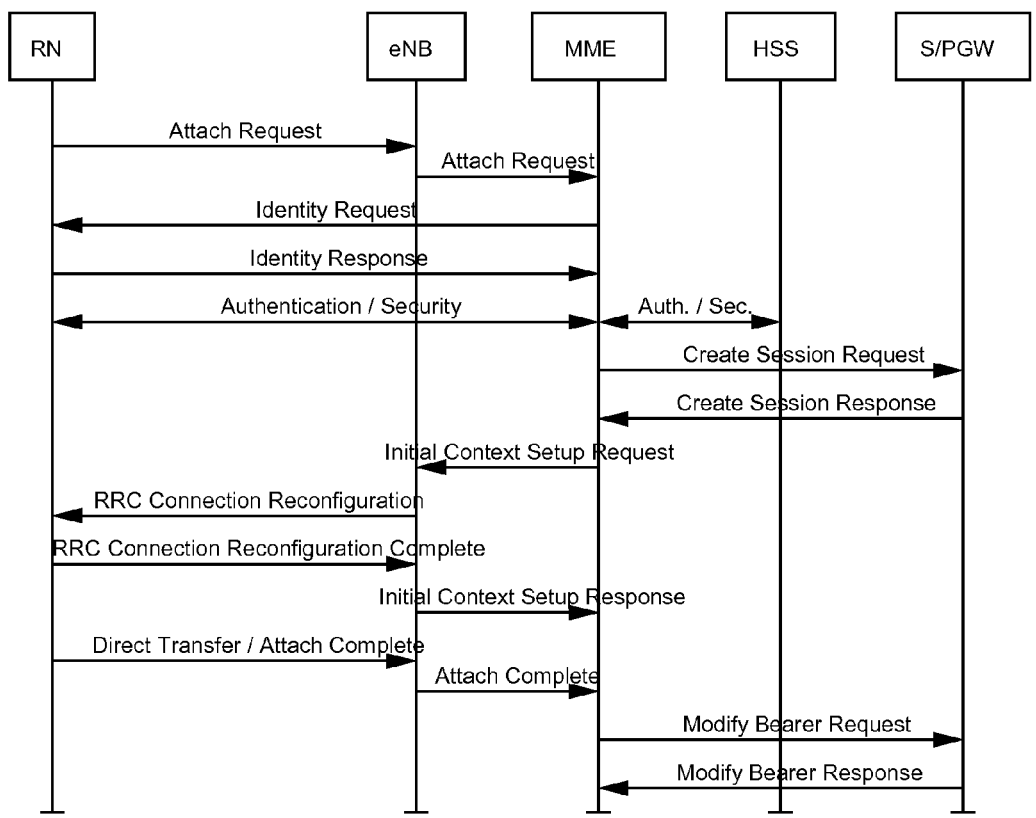
Figure 4:
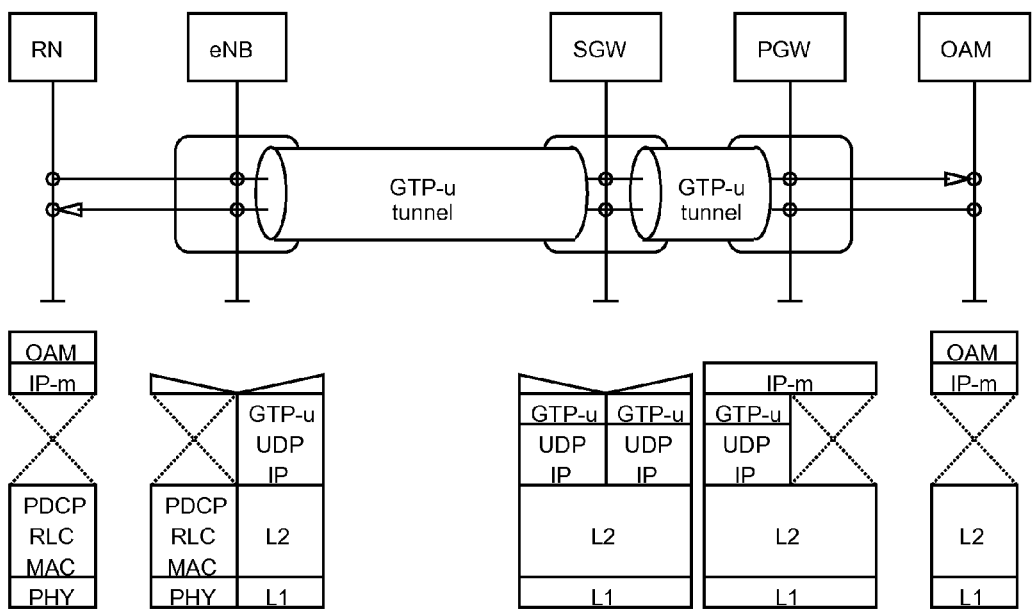
Figure 5:
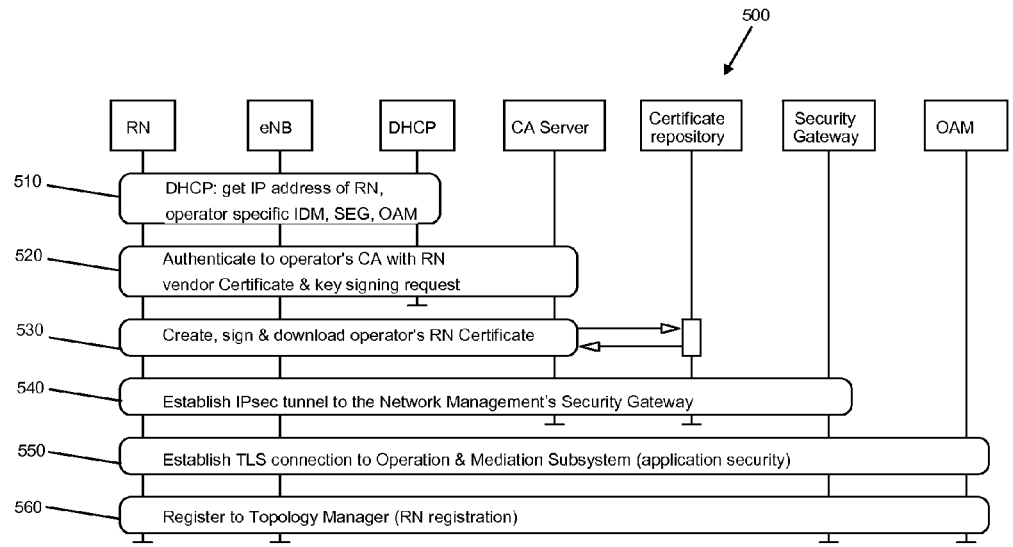
Figure 6:
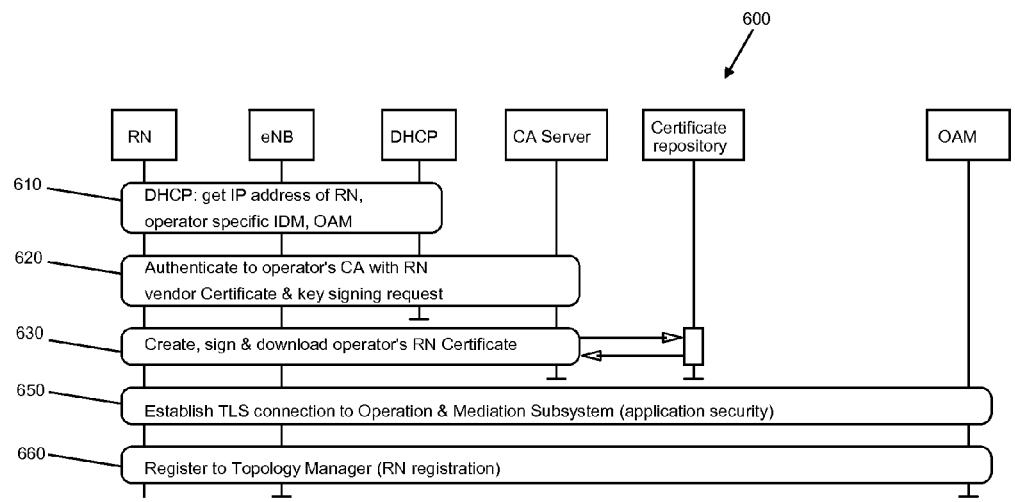
Figure 7:
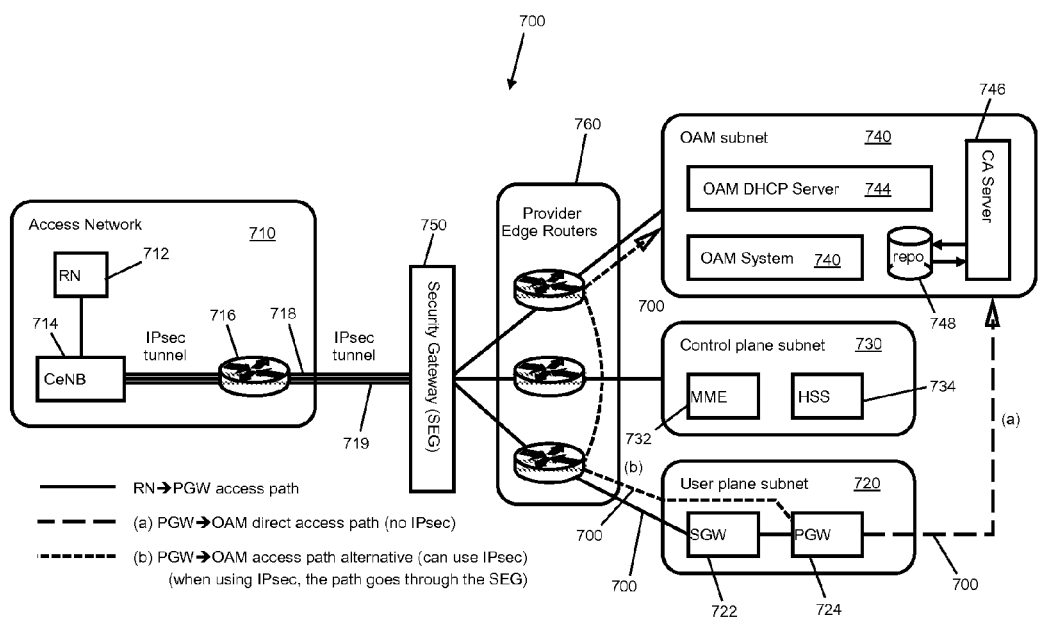

An embodiment of the invention will now be described, by way of example only, with reference to the accompanying drawings in which:

FIG. 1 shows a network configuration;
FIG. 2 shows a traffic path and protocol stacks and layers;
FIG. 3 shows an Attach procedure;
FIG. 4 shows another traffic path and protocol stacks and layers;
FIG. 5 shows an auto connection and authentication procedure;
FIG. 6 shows another auto connection and authentication procedure; and
FIG. 7 shows an LTE backhaul configuration extended for relay node auto-connectivity.

FIG. 1 has been described in the foregoing. Although it is possible to pre-configure the RN so that it already has an assigned DeNB association, this can be difficult to arrange in all circumstances and so, in one implementation of the invention, during configuration of an RN, a desired DeNB association is not known in advance. This avoids the need for careful manual configuration of the RN. Dependent on the way in which the RN selects the DeNB, information relating to this DeNB may not even be available before the configuration process itself has computed relevant dynamic parameters, which may be dynamic radio parameters (such as TX power, antenna tilt/azimuth), cell parameters (such as physical/global cell ID of the RN cell), and also the DeNB association. Such computation is generally carried out by the OAM system itself once the RN has established its OAM connection. For that reason, during RN self-configuration, the RN makes an initial connection to an arbitrary eNB, which will be referred to as a configurator eNB, or an initial eNB.

Incorporating a relay node into a mobile network will now be described with reference to FIG. 2. This shows a DHCP traffic path through a user plane (U-plane) GTP (GPRS Tunnelling Protocol) tunnel to a core network and also shows layers of protocol stacks involved in different network elements.

As described in the foregoing, an RN can initially connect to an eNB via the Uu interface. This is usually used for UE access and is generally not for use by network elements. Accordingly in order to connect via the Uu interface, the RN acts as a UE. This means that the RN has two functions: a UE function which enables it to operate as a UE and a RN function which enables it to operate as an RN.

A procedure to incorporate the RN involves the stages of preparation, connectivity establishment as a UE, connectivity establishment as an RN, and establishment of secure connectivity to an OAM subnet. These stages will now be described in turn.

It should be noted that where the term "subnet" (or "sub-network") is used, it is referring to a logically visible, distinctly addressed part of a single Internet Protocol (IP) network. Sub-netting involves dividing a network into groups of elements that have a common, designated IP address routing prefix.

1. Preparation

Preparation, as described in the following, is required to enable auto-connectivity. This is the ability of an RN to establish a connection to an OAM system which can then by used to configure the RN. More specifically, auto-connectivity refers to the Layer 2 (radio/EPS bearer level) and Layer 3 (IP level) connectivity between the RN and the OAM system being set up by automated functions. Auto-connectivity involves this stage 1 and the following stages 2 and 3.

The RN is configured with an APN (Access Point Number) "APN-OAM" defining the OAM subnet as a PDN (Packet Data Network). This enables the RN to operate as a UE.

A PGW (PDN Gateway) is configured to host the APN "APN-OAM". The configuration provides an association between "APN-OAM" and the OAM PDN thus enabling the PGW to route traffic to the OAM subnet. A PGW may provide connection to more that one PDN, with each PDN being distinguished by a unique APN. When a UE wishes to set up a connection to a PDN, it sends the APN referring to the desired PDN. In addition, there is a default PDN associated with each subscription, which is used if no APN is specified by the UE (so initially the UE does not need to know any APN). The APN of the default PDN is stored in Home Subscriber Server (HSS) as part of the subscriber data. As a result, the PGW is configured to be able to route traffic to the OAM subnet defined as "APN-OAM".

Subscription data for the RNs, that is UE identities are pre-provisioned into the HSS. This can be carried out for a number of RNs in a common pre-provisioning operation in which respective subscription data entries for each are created which can subsequently be used in configuration of the associated RNs.

In one embodiment of the invention, a UE data record stored in the HSS is modified to include an extra field, the RN indication, containing either 0 or 1, with a value of 0 indicating a normal UE and a value of 1 indicating an RN. In another embodiment of the invention, in a UE data record stored in the HSS, such an extra field is only provided for RN UE data records with the lack of such a field being taken to be a 0 value and the presence of the extra field containing a 1 being taken to be a 1 value. In this way, there is no need to modify existing subscription data. The RN indication set to 1 indicates that the UE is capable and permitted to operate as a RN.

2. Connectivity Establishment as UE

In this stage, auto-connectivity is initiated. The RN employs a known Attach procedure, for example the Attach procedure used in LTE systems by UEs. The Attach procedure is used to authenticate the RN operating as a UE and establish a default bearer. The authentication is done by the MME by signalling towards the HSS. The default bearer consists of a concatenation of a DRB (Data Radio Bearer) between the RN and the configurator eNB and an EPS (Evolved Packet System) bearer between the eNB and the core network.

However, before the Attach procedure starts, there is an RRC connection establishment between the RN and the configurator eNB. This establishes the physical radio connection (corresponding to the Ethernet layer in wired networks). The RN indication can be sent inside a first RRC connection request message, or in a message sent after the RRC connection has been set up. In the latter case, it is sent in a UE Capabilities message, which is also an RRC-level message, and takes place before the UE Attach procedure. After the RRC establishment and the sending of the RN indication, the Attach request message is sent by the RN. Although initially the RN indication information is sent from the RN to the configurator eNB, it is put in the UE Attach request message by the eNB, thus it is propagated towards the MME. The MME refers to the HSS to see if the UE which has sent an RN indication in the Attach request message is really a RN or just a normal (mis-configured/malicious) UE. This allows the MME to reject Attach request messages in respect of those UEs that are not authorised to operate as a network element. Accordingly, mis-configured UEs appearing to be RNs can rejected at stage 2.

In the invention, in common with LTE, an EPS bearer is realised by a user plane GTP tunnel and its purpose is to provide access to a specific PDN. For UEs, such PDNs are the Internet or IMS (Internet Multimedia Subsystem) services. Each PDN is accessed through a PGW, which provides specific APNs to differentiate between the PDNs. User traffic is carried in a GTP tunnel from the eNB serving the UE to the corresponding PGW.

The PGW maintains a PDP Context which is set up as part of the EPS bearer establishment. The PDP Context contains (among other things) the GTP tunnel endpoint identifier that spans from the PGW to a serving gateway (SGW), the IP address (if available) of the UE/RN to which this tunnel corresponds and also contains the target PDN that is accessed through that GTP tunnel. The PGW removes the GTP header from the packets it receives from the GTP tunnel, and uses IP routing to send the packet to the desired PDN. Packets coming from the PDN destined to the UE/RN are mapped to the PDP Context that contains the corresponding UE/RN address, and the packets are sent in the GTP tunnel associated with the tunnel endpoint identifier stored in the selected PDP Context.

Until the UE/RN receives an IP address, the UE/RN can only send broadcast packets (with source IP address set to 0.0.0.0), like DHCP DISCOVER messages. These messages contain other identifiers that can be used by the PGW to map packets coming from the PDN (as a reply to broadcast requests) to the correct PDP Context and GTP tunnel.

During the Attach procedure, the UE function of the RN uses a Protocol Configuration Options (PCO) element to indicate the manner by which an IP address for the RN is to be obtained. The PCO element usually indicates that to the MME that it should obtain an IP address for the UE/RN automatically or that it should refer to a DHCP server for this entity to provide the IP address. In this case, the PCO element indicates that a DHCP server is to provide the IP address. The PCO element is present in a protocol information entity present in the initial NAS Attach Request message sent by the RN to the MME. The PCO element is propagated by the MME to the SGW and by the SGW to the PGW during the EPS bearer establishment in a GTP-C Create Session Request message. Thus the PGW does not carry out automatic address allocation as part of the bearer establishment.

The Attach procedure is shown in FIG. 3.

It is to be noted that each UE, that is RN, has its own GTP tunnel. Furthermore, network elements, or network nodes, such as eNBs do not have GTP for the purposes of them connecting with the network.

Once the Attach procedure has been successfully carried out and the RN is attached to the mobile network, that is stages 1. and 2. have been completed, the RN has physical (Layer 2) connectivity to the OAM subnet, but does not yet have IP (Layer 3) connectivity. Accordingly, in the next stage, IP connectivity is established.

One way of looking at Layer 2 and Layer 3 is that in Layer 2 links are established between nodes so that they have the means by which they can communicate data with either other in and Layer 3 communication can take place between arbitrary nodes as a result of the nodes being provided with addresses.

3. IP Connectivity Establishment as RN

In order for the RN to establish connectivity so that it is treated as an RN by the OAM system, the RN now follows a conventional DHCP protocol procedure:

The DHCP client on the RN sends a broadcast DHCP DISCOVER message over the radio link to the eNB. At the eNB the DHCP DISCOVER message is sent over the established GTP tunnel to the SGW, which forwards it further to the PGW. At the PGW, the DHCP DISCOVER message is received by a DHCP relay process which sends the message to its configured DHCP server in the OAM subnet. (The sending of the message from the DHCP relay to the DHCP server is enabled by the preceding establishment of the GTP tunnel to the PGW and the configuration of the PGW as described in stage 1. above.) At the DHCP server in the OAM subnet, the DHCP DISCOVER message is processed.

In the event that an IP address can be offered to the RN, for example the DHCP server determines that there is an available IP address in a pool of IP addresses to which it has access, a DHCP OFFER message is sent back from the DHCP server to the DHCP relay which in turn sends it back to the RN. Additional information, such as IP addresses of operator specific network elements in the mobile network, may also be returned by the DHCP server. It should be noted that according to the invention, in the DHCP, different PDNs are assigned to separate and distinct IP address spaces, for example PDN1 has assigned to it an address space ranging from one address through to a higher address and PDN2 has assigned to it a non-overlapping address space ranging from one address through to a higher address.

The protocol entities involved in the conventional DHCP protocol procedure are shown in FIG. 2 which shows a DHCP traffic path through the U-plane GTP tunnel to the core network. In this Figure DHCP messages are sent inside IP packets (with the protocol stack being DHCP/UDP/IP). These IP packets do not contain any specific address, and simply use a host address, such as 0.0.0.0, and a broadcast address, such as 255.255.255.255 (broadcast to all hosts).

At the RN, the received IP address contained in the DHCP OFFER message is configured and used further for OAM-related traffic, such as any application-level traffic exchanged between the RN and the OAM system, for example a registration message send from the RN to the OAM system, or configuration data sent from the OAM system to the RN. These messages are sent in the IP layer over TCP/IP (or SCTP/IP) using the IP address received from the DHCP server.

Additional information received in the DHCP OFFER message is processed and stored in the RN for further usage, for example additional information such as IP addresses of operator specific network elements such as the OAM system.

Once the RN has received the DHCP OFFER message and has configured the data it contains, including received IP addresses and other information, the operation of the system changes from FIG. 2 to FIG. 4.

FIG. 4 shows an OAM traffic path through a U-plane GTP tunnel to the core network. It also shows the layers of various protocol stacks involved in different network elements. The RN has configured the received IP address for use when sending OAM traffic. That is, IP packets have specifically assigned, and not broadcast, IP addresses. The source address of the IP packets sent by the RN is the address received from the DHCP server, and the destination address is the IP address of the OAM node the RN communicates with. Accordingly, "IP-m" refers to connectivity (IP addresses, routing entries, etc. with the OAM subnet). It should be noted that the depicted "OAM" is the OAM protocol stack above IP for the southbound interface (the management interface between a network element (such as the RN or eNB) and the Element Management System (EMS)). Once IP connectivity has been established, any IP traffic may be exchanged over the established connection, for example traffic sent in the application layer (above TCP/IP) between the RN and the OAM system.

4. Establishment of Secure Connectivity to the OAM Subnet

After the initial connection has been set up in stages 2 and 3, the RN has IP connectivity to the OAM subnet and is ready to establish a secure connection to the OAM node or nodes involved in the further steps of the self-configuration process.

The next step is the verification of the identity of the RN and provisioning of operator certificates for secure communication within the operator network and other network elements. This is most commonly realised with a PKI infrastructure. The RN then establishes a mutually authenticated TLS session with the Network Management. In carrying out stage 4, there are two options to establish the secure connection:

1) option 1 which uses IPsec and TLS; or
2) option 2 which only uses TLS.

FIG. 5 shows a message flow involved in auto-connection and authentication 500 and sets out option 1. The first step 510 (concerned with DHCP) is related to IP connectivity establishment and has been described in the foregoing in relation to stage 3. The following steps, 520, 530, 540, and 550, refer to stage 4. The last step 560 (Register to topology manager) related to events subsequent to this, that is events subsequent to stage 4 (secure connection establishment). The first 510 and last steps 560 are included only to put stage 4 into perspective.

In step 520, the RN is authenticated by a certification authority (CA) server of the network. This includes a request for the CA server to obtain a key and sign an RN certificate. In step 530, the CA server cooperates with a certificate repository to create and sign a RN certificate which is provided to the RN. The RN is then able, in step 540, to establish an IPsec tunnel between itself and a security gateway. Once this has been done, in step 550 the RN establishes a TLS connection with an OAM system.

It will be understood that stage 4 relates to the RN functioning as a network element and establishing a secure connection to the OAM subnet. Accordingly, the RN indication referred to in the foregoing in relation to the HSS may be considered to be optional in the sense that in one embodiment it may be omitted altogether. If the RN indication is not used, however, a UE which are not acting as an RN may be provided with the "APN-OAM" APN and then could perform stages 2. and 3. described in the foregoing. This could potentially lead to a Denial-of-Service attack which could result in RNs not being able to perform their own auto-connectivity procedures while such an event is taking place. Therefore, there is an advantage in employing an RN indication within the mobile network to confirm that a particular UE does indeed have the status of being an RN.

Option 1 has the following characteristics:

It is the same as the procedure followed to establish secure connectivity to an OAM subnet used by eNBs. The secure auto-connectivity takes the form of an IPsec tunnel on top of secure transport connectivity using TLS. The IPsec tunnel has an endpoint at the security gateway which comes via the user plane subnet. In case the security gateway is configured to accept IPsec connections only from outside of the trusted domain, as is the case when it receives such connections from eNBs, the security gateway may need to be configured to explicitly enable the IPsec connection establishment from within the trusted domain. If this is not the case, there may be no need at all to modify the security gateway.

FIG. 6 shows a message flow involved in auto connection and authentication according to an alternative procedure and sets out option 2.

The first step 610 (concerned with DHCP) is related to IP connectivity establishment and has been described in the foregoing in relation to stage 3. The following steps, 620, 630, and 640, refer to stage 4. The last step 660 (Register to topology manager) related to events subsequent to this, that is events subsequent to stage 4 (secure connection establishment). The first 610 and last steps 660 are included only to put stage 4 into perspective.

In step 620, the RN is authenticated by a certification authority (CA) server of the network. This includes a request for the CA server to obtain and key sign an RN certificate. In step 630, the CA server cooperates with a certificate repository to create and sign a RN certificate which is provided to the RN. The RN is then able, in step 650, to establish encrypted TLS communication, which may be referred to as a TLS tunnel between itself and a security gateway.

In contrast to option 1, in option 2, the IPsec connection to the security gateway (and the transmission of the IP address of the SEG node to the RN) can be omitted as the RN has in fact already access to the trusted domain by connecting to the U-plane subnet. Accordingly, it will be understood that option 2 refers to a configuration where the IPsec tunnel establishment is omitted, due to the fact that the RN has already a connection to the operator's user plane subnet, which is inside the trusted domain. In common with option 1, the RN authenticates itself using the PKI infrastructure and uses TLS for encrypted communication with the OAM subnet, and in particular with the OAM system.

Option 2 has the following characteristics:

It is not the same as the procedure followed to establish secure connectivity to an OAM subnet used by normal eNBs although it is compatible with this procedure.

Only the secure transport connectivity for the U-plane is employed.

Since the security gateway is not used, it does not need to be specially configured.

Once a secure link to the OAM subnet has been established, it can be used for the RN to carry out further steps in the self-configuration procedure, including auto-commissioning and integration of the RN into the cellular network.

Once the stages 1 to 4 have been completed, the result is shown in FIG. 7. This shows an overview of the LTE backhaul configuration showing the IP subnet configuration and layout of the core network, including the location of IPsec entities and the policies obeyed by the IP routing (e.g., routing between subnets).

FIG. 7 shows an LTE backhaul configuration 700 comprising an access network 710 such as a radio access network (RAN), a user plane subnet 720, a control plane subnet 730, an OAM subnet 740, a security gateway 750, and provider edge routers 760. The security gateway 750 provides secure communication between the RAN 710 and the various subnets 720, 730, and 740. The provider edge routers 760 route communications between the security gateway and the various subnets 720, 730, and 740 and between the various subnets 720, 730, and 740 themselves.

The RAN 710 comprises an RN 712, an eNB 714 designated as a configurator eNB (CeNB), and a router 716. The RN 712 and the eNB 714 are linked by a relay supported backhaul link 718. The CeNB is able to establish an IPsec link with the security gateway 750 via an IPsec tunnel 719.

The user plane subnet 720 comprises an SGW 722 and a PGW 724.

The control plane subnet 730 comprises an MME 732 and an HSS 734. These elements were used in various of the identity and authentication steps described in the foregoing.

The OAM subnet 740 comprises an OAM system 742, an OAM DHCP server 744, a CA server 746, and a repository 748.

The RN 712 is able to establish a GTP tunnel to the PGW 724 as has been described in the foregoing.

Option 1 from the foregoing will now be described. After the GTP tunnel has been set up between the eNB 714 and the PGW 724, the RN 712 is able to establish an IPsec tunnel to the security gateway 750 within the GTP tunnel. This requires negotiation between the endpoints, that is between the RN 712 and the security gateway 750, and the PGW 724 is able to receive negotiation messages and either route them to the security gateway 750 or into the GTP tunnel to go to the RN 712 as necessary. Once negotiation is complete, the RN 712 and the security gateway 750 communicate directly via the IPsec tunnel with the PGW simply routing on the IP packets automatically. It is important to note at this point that the IPsec tunnel 719 is the one established by the CeNB 714 as a normal eNB when it first made a connection to the security gateway 750. The IPsec tunnel between the RN 712 and the PGW 724 is within the IPsec tunnel between the CeNB 714 and the security gateway 724. These will now be referred to as the backhaul IPsec tunnel and the configuration IPsec tunnel respectively.

Accordingly, this means that the configurator IPsec tunnel emerges from an end of the GTP tunnel in the user plane subnet 720 and accordingly leaves the user plane subnet 720 and loops back to the security gateway 750. Once IP packets from this IPsec tunnel emerge at the security gateway 750, they can be provided to the provider edge routers which can then route them as appropriate.

In this way, it can be seen that IP packets being conveyed from the RN 712 having as their destination the OAM subnet, will pass twice through the security gateway, a first time within the GTP tunnel and a second time when they arrive at the security gateway an emerging from the IPsec configurator tunnel.

Option 2 from the foregoing will now be described. After the GTP tunnel has been set up between the eNB 714 and the PGW 724, the RN 712 is able to authenticate itself using the PKI infrastructure and use TLS for encrypted communication with the OAM subnet 740, and in particular with the OAM system 742. To do this, the RN 712 establishes a TLS "tunnel" to the OAM system 742 which for at least part of its extent, is within the GTP tunnel. This requires negotiation between the endpoints, that is between the RN 712 and the OAM system 742, and the PGW 724 is able to receive negotiation messages and either route them to the OAM system 742 or into the GTP tunnel to go to the RN 712 as necessary. Once negotiation is complete, the RN 712 and the OAM system 742 communicate over an encrypted TLS connection.

According to option 2, the PGW 724 may communicate with the OAM subnet over different connections/via different interfaces depending on the implementation of the network. As has been described in the foregoing, the PGW 724 has been configured with the necessary subnet information. For example, it may have special routing entries added into its routing table relating to the APN-OAM so that when it is instructed to send a message to the OAM subset, is may simply forward it through the relevant interface and then via the relevant IP router identified by a particular IP address.

Two implementations are shown in FIG. 7, which are marked as (a) and (b). In the case of implementation (a), if there is a pre-existing user plane subnet-OAM subnet in place, the PGW simply sends communications, properly addressed, to the OAM subnet over this interface. In the case of implementation (b), there may not be a pre-existing user plane subnet-OAM subnet in place or there may be and it is simply preferred that it not be used, and so the PGW sends communications, properly addressed, to the OAM subnet over via the provider edge routers 760 and the communications are routed to the correct entity in the OAM subnet.

Referring to description in the foregoing and to FIG. 7 it will be understood that there are various tunnels and levels of security within, or on top of, each other. For example, between the eNB and the security gateway, TLS encrypted data is inside an IPsec tunnel having an endpoint at the RN, which is inside the GTP tunnel, which is inside another IPsec tunnel having an endpoint at the eNB. Various of these tunnels and encrypted links extend by different degrees through the network. For example, an IPsec tunnel established by the eNB extends only between itself and the security gateway, a GTP tunnel extends between the eNB and the PGW, an IPsec tunnel established by the RN extends between itself and the security gateway (via the user plane subnet) and the TLS encrypted link extends all of the way from the RN to the OAM subnet.

According to the procedure to incorporate the relay node, a connection has been established between a network operator user plane subnet and a network operator OAM subnet. It will be understood that connectivity needs to exist between these two subnets because traffic from the RN towards the OAM system leaves the GTP tunnel in the operator user plane subnet and traffic from the OAM system towards the RN enters the GTP tunnel in the operator user plane subnet. Therefore, as will have been seen, the RN establishes a connection to the operator user plane subnet and from there connect to the OAM system. The RN establishes a connection to the operator user plane subnet in a way which is similar to that by which a UE obtains access. The RN, acting as an UE, establishes a connection (through one or more GTP tunnels) into the operator's user plane subnet, to a specific PGW. Connecting from the user plane subnet to the OAM is done by configuring a PGW so that it provides a connection to the OAM subnet.

Establishing a connection to the DeNB takes place after self-configuration of the RN. This is referred to as network integration. It can happen regularly during the lifetime of the RN as it changes its DeNB association. The RN may switch over to a particular DeNB rather than continuing to use the initial eNB although this does not have to be the case. For example, there is no problem in using the configurator eNB in those cases when it turns out (after the DeNB selection process) that the DeNB in fact is the same eNB that is already being used as the configurator eNB.

The invention shifts the complexity of manual configuration work of a service technician in the field to a pre-configuration phase. Therefore, there is no need for a deployment/commissioner person to wait until an RN node boots up and then perform manual configuration in order for the RN even to be able to access the OAM subnet. According to the invention, this is done automatically by the RN establishing the connection to the OAM system itself. This makes it possible to add RNs quickly to the network. Since auto-configuration is based on DHCP and the DHCP server can deal with potentially thousands of DHCP clients, the invention is scalable.

The invention does not impose any additional requirements on the configurator eNB. That means any eNB accessible by the UE function of the RN can be used as the configurator eNB. After self-configuration (including the selection of DeNB association) is done, the RN can establish connection to the DeNB and completely detach from the configurator eNB if it turns out to be different from the DeNB.

The invention relies on connectivity between the PGW and OAM subnet which may be pre-existing and therefore may not need to be specifically configured.

Defining the OAM as a subnet and enabling access to it via the PGW by using an APN-OAM allows, on one hand, the use of standardised UE-related procedures and, on the other hand, prevents instances of those procedures used by normal UEs to interfere with the instances for the RNs. In other words, this avoids the DHCP relay process at the PGW employed to forward RN DHCP traffic to the DHCP server in the OAM subnet interfering with DHCP-based address allocation for regular UEs.

It should be noted that the Uu interface is the only interface via which a radio equipment (UE or RN) can connect to a base station. After the RN has completed the whole self-configuration process, that is stages 1. to 4. and subsequent steps involving software downloading and configuration data downloading, it will use another, similar, interface for relaying user plane data to the base station—this is the Un interface. The Un interface is not available for connection establishment.

One advantage of the invention is that it is compatible with various architectural alternatives proposed during discussion in 3GPP on how to integrate relays into the RAN infrastructure, for example terminating the user plane of the S1 interface, that is the interface between an evolved universal terrestrial radio access network and a core network node, at the RN or at the DeNB.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of establishing connectivity between a network node and a configuration entity in a communications network, the method comprising the steps of:
   the network node making an initial attachment to the communication network via an initial base station, the attachment occurring in the absence of the network node being configured with an identification of a donor base station which the network node is allowed to access and in advance of seeking to establish a connection with a particular desired donor base station;
   establishing a connection between the network node and a user plane of the communications network;
   addressing communications to the configuration entity defined as residing in a configuration entity subnet; and
   routing the communications from the user plane to the configuration entity subnet in order that the network node becomes configured with at least one identification of a donor base station which the network node is allowed to access by the configuration entity so that the network node is able to establish a connection between the network node and the particular desired donor base station.

2. A method according to claim 1 in which the connection is established to a gateway in the user plane.

3. A method according to claim 1 in which the network node requests that the network node be assigned a network address.

4. A method according to claim 1 in which the network node makes an initial connection to an initial base station.

5. A method according to claim 1 in which a network entity is configured with an access point number defining the configuration entity as a packet data network so that the network node is able to route traffic to the configuration entity.

6. A method according to claim 1 in which an attach procedure used to carry out an authentication step to establish a default bearer.

7. A method according to claim 1 in which a network node indication is sent to a mobility management entity in a connection request to allow the mobility management entity to reject connection requests in respect of mobile terminals that are not authorised to operate as a network node.

8. A method according to claim 1 in which the network node is a relay node.

9. A method according to claim 1 in which once a secure link to the configuration entity has been established, the secure connection can be used for the network node to carry out further steps in a self-configuration procedure.

10. A method according to claim 1 in which a secure tunnel is established which passes through a gateway to extend to the user plane and then returns back to the gateway where the secure connection terminates.

11. A method according to claim 1 involving the stages of preparation, connectivity establishment as a mobile terminal, connectivity establishment as a network node, and establishment of secure connectivity.

12. A method according to claim 1 in which the connectivity is established to enable the network node to be configured by the configuration entity.

13. A communication network comprising:
   a network node, a user plane, and a configuration entity, the network node being capable of establishing connectivity with the configuration entity and making an initial attachment to the communication network via an initial base station, the attachment occurring in the absence of the network node being configured with an identification of a donor base station which the network node is allowed to access and in advance of seeking to establish a connection with a particular desired donor base station, the communications network being configured to establish a connection between the network node and the user plane, the network node being capable of addressing communications to the configuration entity defined as residing in a configuration entity subnet, the communications network being configured to route communications from the user plane to the configuration entity subnet in order that the network node becomes configured with at least one identification of a donor base station which the network node is allowed to access by the configuration entity so that the network node is able to establish a connection between the network node and the particular desired donor base station.

14. A network node capable of establishing connectivity with a configuration entity in a communications network, the network node comprising:
   a protocol capability configured to establish a connection between the network node and a user plane of the communications network; and
   an addressing capability configured to address communications to the configuration entity defined as residing in a configuration entity subnet in order that the communications are routed from the user plane to the configuration entity subnet in order that the relay node becomes configured with an identification of a donor base station which the network node is allowed to access by the configuration entity so that the network node is able to establish a connection between the network node and a particular desired donor base station,
   wherein the network node is configured to make an initial attachment to the communication network via an initial base station, the attachment occurring in the absence of the relay node being configured with the identification of the donor base station which the network node is allowed to access and in advance of seeking to establish a connection with the particular donor base station.

* * * * *